Figure 1:
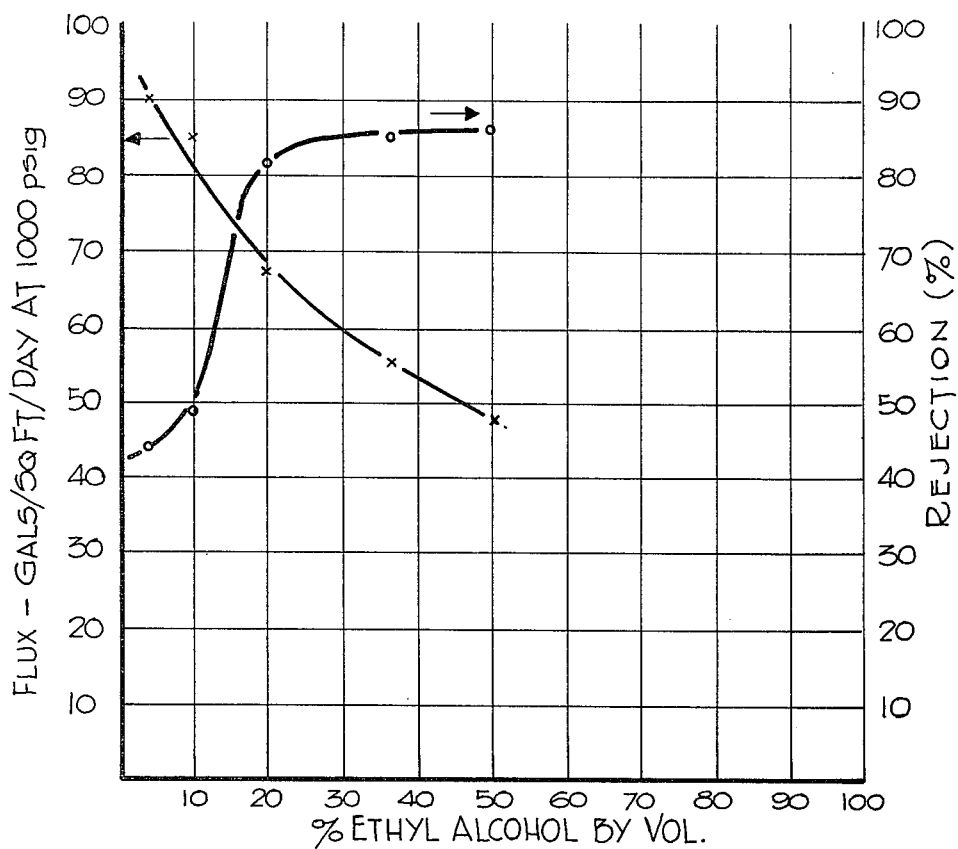

United States Patent [19]

Kutowy et al.

[11] 4,145,295
[45] Mar. 20, 1979

[54] CELLULOSE ESTER ULTRA-FILTRATION MEMBRANES AND THEIR MANUFACTURE

[75] Inventors: Oleh Kutowy, North Gower; William L. Thayer; Srinvasa Sourirajan, both of Ottawa, all of Canada

[73] Assignee: Canadian Patents and Development Limited, Ottawa, Canada

[21] Appl. No.: 824,642

[22] Filed: Aug. 15, 1977

[51] Int. Cl.² ................... B01D 13/04; B01D 31/00; B29D 27/04

[52] U.S. Cl. .................. 210/500 M; 264/41; 264/331

[58] Field of Search .............. 264/41, 49, 331; 210/500 M

[56] References Cited

U.S. PATENT DOCUMENTS

| | | | |
|---|---|---|---|
| 3,412,184 | 11/1968 | Sharples et al. | 264/41 X |
| 3,432,584 | 3/1969 | Cannon et al. | 264/41 X |
| 3,439,074 | 4/1969 | Sharples et al. | 264/41 |
| 3,592,672 | 7/1971 | Rowley et al. | 264/41 X |
| 3,646,179 | 2/1972 | Stana | 264/41 |
| 3,957,935 | 5/1976 | Staude | 210/500 M X |

FOREIGN PATENT DOCUMENTS 1272574  5/1972  United Kingdom ............ 264/41

*Primary Examiner*—Philip Anderson
*Attorney, Agent, or Firm*—Richard J. Hicks; Stanley E. Johnson

[57] ABSTRACT

A process for preparing ultra-filtration membranes and the product thereof, in which a selected cellulosic-ester polymer solution is cast into a thin film, at about ambient temperature, partially dried and immersed in a gelation bath at $-20°$ to $+30°$ C. The gelation bath contains a sufficient percentage by volume of ethyl alcohol or other organic polar compound to ensure that a flux rate in excess of the initial minimum is achieved. In this way, ultra-filtration membranes having water flux rates selected from within the approximate range 14–10,000 gals./sq.ft./day at 100 psig and a molecular weight cut off above about 15,000, can be produced.

13 Claims, 4 Drawing Figures

CELLULOSE ESTER ULTRA-FILTRATION MEMBRANES AND THEIR MANUFACTURE

This invention relates to cellulosic-ester semi-permeable membranes, and their preparation and more particularly to semi-permeable membranes for use in ultra-filtration techniques.

Cellulosic-ester polymer semi-permeable membranes have been developed in recent years for use in the process known as reverse osmosis for the separation of solvents and solutes as, for example, in the desalination of sea water, and in the removal of salts, such as nickel chloride, from the effluent of plating processes and the like. In such processes the principal aim is to achieve maximum "rejection" of solute at reasonable "flux." As used in the art, the term "rejection" is defined as the percentage of solute removed, this being determined by the expression $(1 - (C_p/C_b)) \times 100$ where $C_p$ is the concentration of the solute in the solvent after it has passed through the membrane and $C_b$ is the initial solute concentration. Rejection rates in excess of 98% are not uncommon in modern reverse osmosis membrane systems. The term "flux" is defined as the amount of solvent permeating through the membrane per unit surface area per unit time at a constant specified pressure. Flux rates of the order of 40-90 gals./sq.ft./day at 1000 psig operating pressure or 10-50 gals./ft.$^2$/day at 500 psig, are considered acceptable in most reverse osmosis systems.

Generally, reverse osmosis semi-permeable membranes are produced by casting, from a solution of a cellulosic-ester polymer in a suitable volatile solvent onto a supporting surface, generally a glass or other plate if a flat membrane is required or a tubular sheath if a tubular membrane is required, and allowing the volatile solvent to evaporate partially from the cast membrane and thereafter treating the partially dried cast membrane in a gelation bath with an aqueous solution of a polar compound, organic or inorganic, which does not react chemically with the polymer or the volatile solvent and which is miscible with the volatile solvent, so as to leach out the solvent and any additives from the cast membrane and thereby leave a porous structure in the membrane. Suitable polar compounds include lower alcohols such as methanol, ethanol and propanol; dihydric compounds such as ethylene glycol, trihydric solvents such as glycerine and mixtures of any of the foregoing. It has been found that the pore size can be controlled by, among other parameters, selecting the concentration of the polar compound and hence the flux and rejection characteristics can be modified. As the concentration of the polar compound increases, the flux falls to a minimum and the rejection rate rises to a maximum, depending upon the pressure and the specific compositions involved. We have found that there comes a point, however, where a remarkable and totally unexpected reversal of the aforementioned generalization occurs and which will hereinafter be referred to as the "initial minimum". The rejection rate falls dramatically to a minimum with a relatively small increase in polar compound concentration while the flux rate increases, equally dramatically, from the initial minimum to a first maximum and subsequently continues to increase on a logarithmic scale as the concentration of polar compound in the gelation bath increases beyond that required to produce the initial minimum. In this regard attention is directed to U.S. Pat. No. 3,412,184 issued Nov. 19, 1968 to Sharples and Banks and to British Pat. No. 1,272,574 published May 3, 1972 in the names of Carter and Psaras. According to the prior art, in the production of reverse osmosis membranes, alcohol concentrations up to about 50 grams per 100 cc. of solution (about 55% by volume) may be employed in the gelation bath, it being noted that, for the particular compositions tested an increase in the alcohol concentration reduces the membrane's permeability, i.e. reduces the flux, while increasing the solute rejection efficiency. It is quite clear, therefore, that in the prior art referred to, the concentration of the polar compound never exceeds that required to produce the initial minimum. Further, the prior art teaches that reducing pressure reduces flux.

Other uses for semi-permeable membranes require flux and rejection characteristics quite different from those generally required for reverse osmosis. For example, ultra-filtration membranes, used industrially for such purposes as the treatment of oily waste waters for pollution control, blood dialysis and treatment of mineral tailings ideally require both high rejection rates (of the order of 96%) and high throughputs, i.e. flux rates of the order of 100 to 10,000 gals./ft.$^2$/day at operating pressures of the order of 100 psi or lower.

It will be appreciated that, in ultra-filtration, the size of the "solute" is generally far larger than that in reverse osmosis systems and such "solute" may be organic or inorganic. Generally organic "solutes," such as starch, vitamins, proteins and the like have extremely high molecular weights (in excess of 15,000) but in certain circumstances relatively low molecular weight compounds, such as oils, may be successfully treated. Ultra-filtration techniques can also be applied to colloidal suspensions, mixtures and emulsions which include oils, inorganic materials such as finely divided coal or mineral tailings, and the like.

It is an object of the present invention to provide an ultra-filtration membrane having a flux rate selected from within the approximate range 14-10,000 gals./sq. ft./day at 100 psig which will separate relatively large solutes such as those having a molecular weight in excess of about 15,000.

Another object of the present invention is to provide a process for producing an ultra-filtration membrane having a flux rate selected from within the approximate range 14-10,000 gals/sq. ft./day at 100 psig, at high rejection rates for selected solutes.

Thus, by one aspect of this invention there is provided in a process for producing a cellulosic ester semi-permeable membrane wherein a thin film is cast from a mixture comprising cellulosic ester polymer, pore forming additive and casting solvent, a portion of the casting solvent is removed from the film and the film is immersed in a gelation bath containing a polar organic compound which is miscible with said casting solvent, the improvement, for producing an ultra-filtration membrane, comprising controlling the temperature of said gelation bath at a selected temperature in the range $-20°$ C. to $+30°$ C. and selecting the concentration of said polar compound in said gelation bath to be greater than that required to produce the initial minimum flux for said membrane.

By another aspect of this invention there is provided a cellulosic ester ultra-filtration membrane, produced as hereinabove defined, having a flux rate in the range 14-10,000 gals./sq. ft./day at 100 psig.

Figure 3:
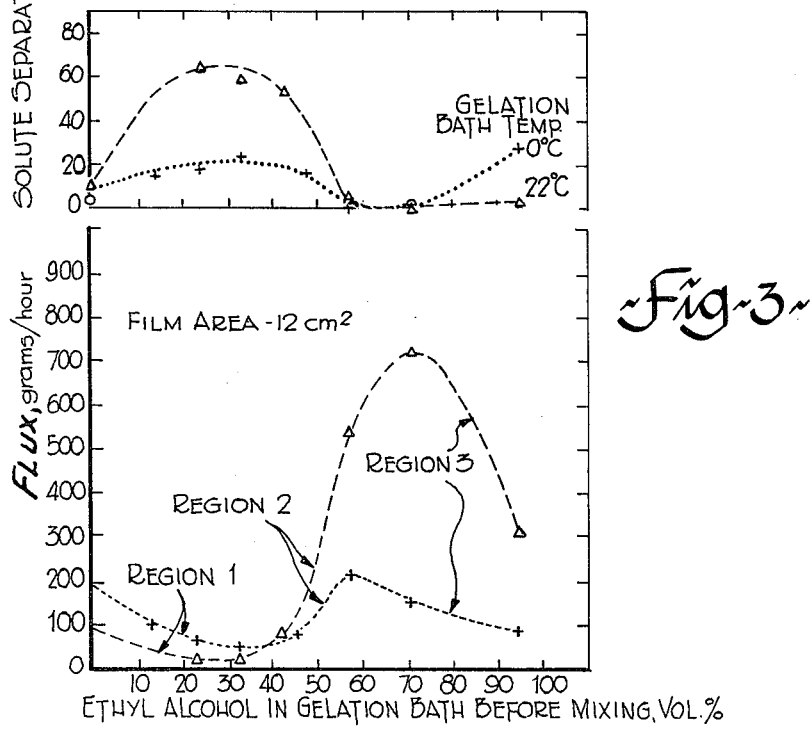
Figures 2A, 2B:
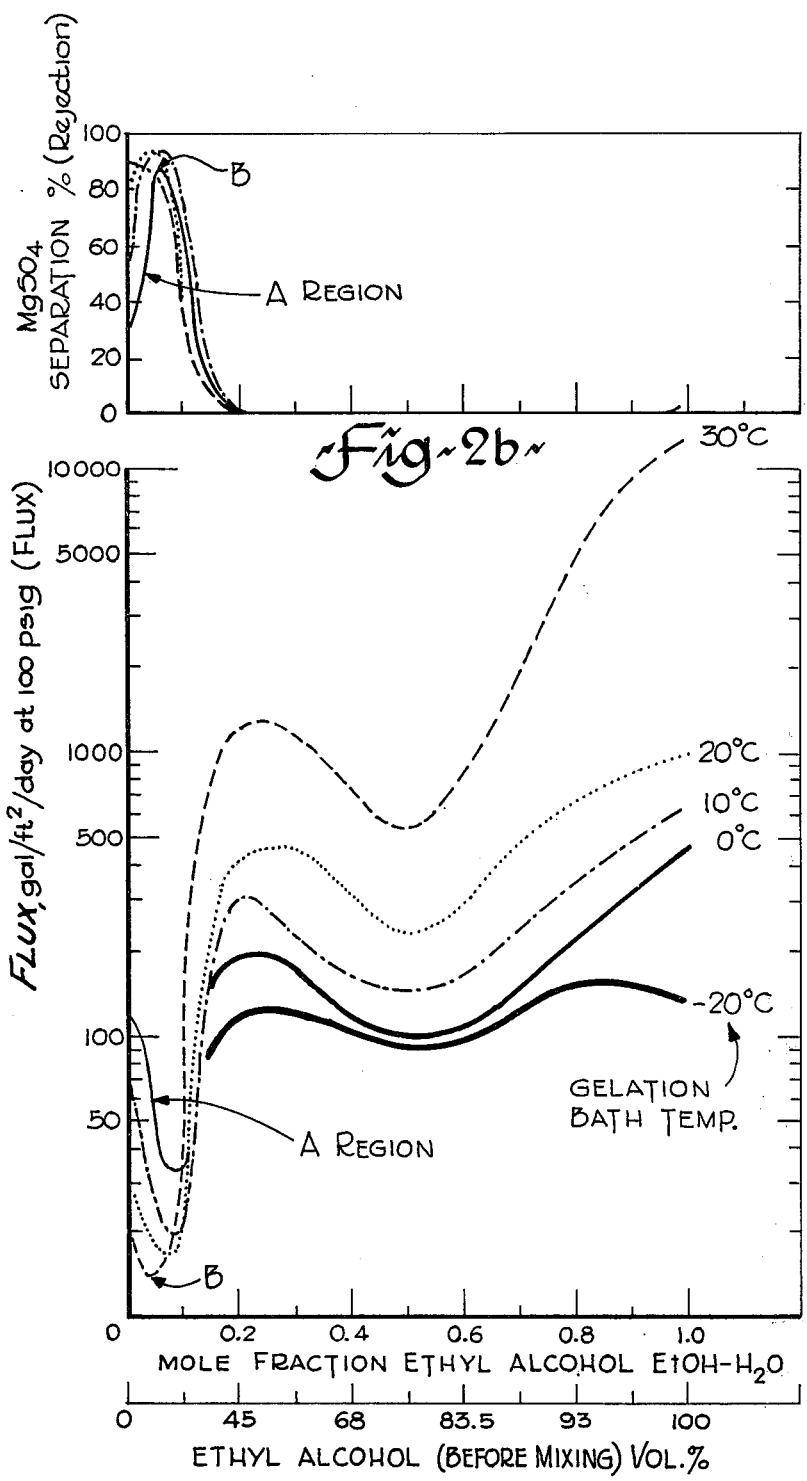

The invention will be described in more detail hereinafter with reference to the examples and accompanying drawings in which:

FIG. 1 is a graph illustrating flux and rejection rates (for NaCl at 1000 psig) according to the prior art;

FIG. 2(a) is a graph relating product rate (flux in gal./sq. ft./day at 100 psig) against ethyl alcohol content of the gelation bath, at various gelation bath temperatures, FIG. 2(b) is a similar graph showing $MgSO_4$ separation against ethyl alcohol content of the gelation bath at the gelation bath temperatures illustrated in FIG. 2(a); and FIG. 3 is a graph similar to FIG. 2(a) relating product rate to ethyl alcohol content for a different membrane system.

As pointed out hereinabove, the use of up to about 55% by volume ethyl alcohol gelation baths for reverse osmosis membranes (25% cellulose acetate/45% acetone/30% formamide), which are generally operated at 500–1000 psig, has been described by Sharples et al who were concerned with achieving the maximum rejection rate for dissolved salts such as $NiCl_2$, NaCl and $MgSO_4$ in aqueous solutions. Typical flux and rejection rates are illustrated in FIG. 1 for NaCl.

FIG. 1 (taken from data in Sharples et al, supra) illustrates that as the percentage of ethyl alcohol in the gelation bath increases towards about 50%, the flux in gals./sq. ft./day at 1000 psig falls to a minimum while at the same time the rejection rate rises to a maximum beyond which further gains in rejection are negligible for the type of solute under consideration. Similar curves for flux and rejection rates at 500 psig have been produced and, as expected, are generally somewhat lower in absolute terms. Even lower values would be anticipated at 100 psig, the pressure level illustrated in FIGS. 2(a) and 2(b).

FIGS. 2(a) and 2(b) are graphs illustrative of the present invention and it will be observed that region A in both FIGS. 2(a) and 2(b) corresponds generally to the shape of the curves illustrated in FIG. 1, i.e. as ethyl alcohol concentration increases the flux falls to a minimum and the rejection rate rises to a maximum, although, at the pressure and with the specific compositions involved, the mole fraction or volume of ethyl alcohol required to achieve the respective minimum and maximum is different. At point B (hereinafter referred to as "the initial minimum"), however, there is a remarkable and totally unexpected reversal. The rejection rate falls dramatically to a minimum with a relatively small increase in alcohol concentration while the flux rate increases, equally dramatically, from the initial minimum to a first maximum and subsequently continues to increase on a logarithmic scale as the concentration (volume %) of ethyl alcohol in the gelation bath increases beyond that required to produce the initial minimum. While it is obvious that membranes treated with relatively high concentrations of ethyl alcohol are not suitable for reverse osmosis applications for the separation of generally relatively low molecular weight solutes, such as inorganic salts, as illustrated by the dramatic fall off in rejection rate for $MgSO_4$, such membranes are of enormous interest for ultra-filtration systems where high flux rates, at relatively low pressures are desired, for selected solutes. It will be appreciated by those skilled in the art that the principles of operation of reverse osmosis and ultra-filtration membranes are not to be confused with the principles of conventional screening. A conventional screen will pass any sized particle smaller than the hole-size of the screen whereas in reverse osmosis and ultra-filtration membranes the pore size is always much larger, often by an order of magnitude, than the size of solute which will pass therethrough and further the mechanism involved can vary from one of repulsion of solute from the pore opening to one of attraction to the side of the pore opening. Mere pore size, i.e. leaching rate by ethyl alcohol or other solvent, is not, therefore, the sole factor in determining the flux and rejection rates of a particular membrane. It is, however, surprising that the inversion at point B in FIGS. 2(a) and 2(b) should occur and, further that the flux rate should increase so dramatically thereafter.

As will be appreciated FIGS. 1 and 2 illustrate product flow or flux rates at pressures which differ by an order of magnitude, and at the lower pressure of FIG. 2, the whole of the curve illustrated in FIG. 1, i.e. up to about 50% ethyl alcohol in the gelation bath, has been compressed into region A, i.e. up to about 20% by volume ethyl alcohol, in FIG. 2. It is believed, therefore, that although pore size and product rate are clearly related, such relationship is not linear and not entirely predictable. It is simply not possible to predict that because ethyl alcohol in amounts up to 50% by volume in a gelation bath yields a reverse osmosis membrane having a high-separation rate for magnesium sulphate at a product rate of the order of 40–100 gals./sq.ft./day at 1000 psig, flux rates, of an order of magnitude or more, higher can be achieved at a pressure of 100 psig merely by increasing the percentage volume of alcohol in the gelation bath. Indeed, the prior art tends to the opposite conclusion. From FIG. 2 it is clear that the temperature of the gelation bath also affects the flux rate of the membrane. Generally, the higher the temperature, in the range $-20°$ C. to $+30°$ C., the greater the flux rate at any selected alcohol percentage concentration, and this is also contrary to the teaching of the prior art.

Although ethyl alcohol is preferred in gelation baths according to the present invention other polar organic compounds such as monohydric alcohols such as methanol, isopropanol, dihydric solvents such as ethylene glycol and trihydric solvents such as glycerine are also suitable. Mixtures of such polar compounds may also be used.

The composition of a cellulosic ester membrane for ultra-filtration use (solvent/polymer and non-solvent/polymer ratios of the order of 4.26 and 1.5) generally differs somewhat from that conventionally employed for reverse osmosis use (solvent/polymer and non-solvent/polymer ratios of the order of 3.01 and 0.495). It has been found that a casting solution comprising:

cellulose acetate: 13–19 wt.%
acetone: 58–68 wt.%
water: 14–22 wt.%
and magnesium perchlorate: 1.3–3.3 wt.% is suitable, and a preferred composition is cellulose acetate: 14.8 wt.%
acetone: 63 wt.%
water: 19.9 wt.%
and magnesium perchlorate: 2.3 wt.%

The casting solution for ultra-filtration membranes and reverse osmosis is preferably cast at ambient temperature (about 18°–26° C.). As discussed in detail hereinabove, after solvent evaporation for a short time (of the order of 1 to 15 seconds) the ultra-filtration membrane film is immersed in a gelation bath containing an organic solvent, such as ethyl alcohol, in an amount from 25-100% by volume and preferably 55-95%. The balance of the gelation bath, if any, is conveniently water. The temperature of the gelation bath should be in the range −20° C. to +30° C. and no post heating is generally required.

It will be appreciated that in the following examples, the membranes described therein may be made in either a batch mode or in a continuous mode in which the casting solution is continuously fed onto a casting surface and thereafter gelled and leached on a continuous basis.

EXAMPLE 1

Preparation of Membranes

A film casting solution comprising:
cellulose acetate E-400-25*: 14.8% by wt.
acetone: 63.0% by wt.
water: 19.9% by wt.
and magnesium perchlorate: 2.3% by wt.

*Trade designation of Eastman Organic Chemicals, Division of Eastman Kodak Company was divided into two portions for the production of (a) one inch diameter tubular membranes and (b) flat membranes, using the conventional casting, drying and gelation steps under the following conditions:

(a) Tubular Membranes

Temperature of casting solution: ∼22° C. (room temperature);
Driving pressure on casting solution: 65 psig;
Film casting speed: one inch per second;
Air flow rate: 28 cc/sec.;
Temperature of solvent evaporation zone: ∼22° C. (room temperature);
Length of solvent evaporation zone: 6 to 15 inches as indicated;
Atmosphere of above zone: air, or air + acetone vapor or air + (acetone + water) vapor as indicated;
Gelation bath: flowing water, or acetone + water mixture or ethyl alcohol + water mixture, as indicated;
Temperature of gelation bath: 0° to 22° C. as indicated;
Gelation time: 10 to 60 minutes as indicated;
Leaching bath: water at 0° to 1° C.;
Leaching time: 1 hour.

(b) Flat Membranes

Temperature of casting solution: ∼22° C. (room temperature);
Temperature of solvent evaporation atmosphere: ∼22° C. (room temperature);
Solvent evaporation atmosphere: air, or air + (acetone + water) vapor, as indicated;
Solvent evaporation time: 0 to 5 seconds;
Gelation bath: water or (ethyl alcohol + water) mixture as indicated;
Temperature of gelation bath: −15° to +20° C. as indicated;
Gelation time: 15 minutes;
Leaching bath: water at ∼1° C.;
Leaching time: 1 hour;

(c) Flat Membranes

Temperature of casting solution: ∼22° C. (room temperature);
Temperature of solvent evaporation atmosphere: ∼22° C. (room temperature);
Solvent evaporation atmosphere: ambient air, relative humidity: 85–90%;
Solvent evaporation time: 0 to 5 seconds;
Gelation bath: water, or (ethyl alcohol + water) mixture or absolute ethyl alcohol as indicated;
Temperature of gelation bath: −20° C. to 30° C. as indicated;
Gelation time: 10 minutes;
Leaching bath: water at ∼1° C.;
Leaching time: 1 hour.

(d) Flat Membranes

Gelation bath: 50% (by volume) of methanol, ethanol, isopropanol, or ethylene glycol in water-alcohol mixture;
Temperature of gelation bath: 20° C.;
All other conditions same as in Example 1(c).

EXAMPLE 2

Samples of the tubular and flat membranes prepared in Examples 1(a), 1(b), 1(c) and 1(d) were tested for reverse osmosis performance at 100 psig operating pressure with a feed solution containing 300 ppm magnesium sulphate-water, at a feed flow rate of 500 cc/min. Table I hereinbelow tabulates the results of a set of 4 ft. long, one-inch diameter tubular membranes, prepared in accordance with Example 1(a).

TABLE I

| Film Casting Conditions | T1* | T2 | T3 | T4 | T5 | T6 | T7 | T8 |
|---|---|---|---|---|---|---|---|---|
| Length of solvent evaporation zone | 6″ | 12″ | 12″ | 12″ | 15″ | 15″ | 15″ | 15″ |
| Atmosphere of above evaporation zone | Air + 50/50 acetone/H₂O vap. | Air + 50/50 acetone/H₂O vap. | Air + 50/50 acetone/H₂O vap. | Air + pure acetone vap. | Air + 50/50 acetone/H₂O vap. | Air | Air | Air |
| Gelation bath | water | water | 5% acetone-water | water | 33% EtOH-water | 33% EtOH-water | 50% EtOH-water | 50% EtOH-water |
| Temp. of gelation bath | 1° C. | 1° C. | 8° C. | 1° C. | ≈0° C. | ≈0° C. | ≈0° C. | 20° C. |
| Gelation time | 60 min. | 60 min. | 15 min. | 60 min. | 10 min. | 10 min. | 10 min. | 10 min. |
| Solute Separation % | 71 | 85 | 62 | 89 | 28 | 11 | 1 | ≈0 |
| Water flux, | | | | | | | | very |

TABLE I-continued

| Film Casting Conditions | Data for Set 1 Tubular Membranes | | | | | | | |
|---|---|---|---|---|---|---|---|---|
| | T1* | T2 | T3 | T4 | T5 | T6 | T7 | T8 |
| gal/day ft² | 35.8 | 33 | 26.9 | 40 | 90 | 107 | 200 | high |

*Air flow rate: 14 cc/sec

Table II sets forth comparable data in respect of flat membranes prepared in accordance with Example 1(b).

Table II

| Film Casting Conditions | Data for Set 2 Flat Membranes | | | | |
|---|---|---|---|---|---|
| | F1 | F2 | F3 | F4 | F5 |
| Solvent evaporation atmosphere | Air | Air | Air | Air | Air |
| Gelation bath | Water | Water | 20% EtOH-Water | 33% EtOH-Water | 33% EtOH-Water |
| Temp. of gelation bath | 21° C. | 1° C. | 7° C. | −15° C. | +15° C. |
| Solute separation, % | 85 | 70 | 75 | 20 | 15.5 |
| water flux, gal/day ft² | 35.8 | 71.6 | 58 | 89 | 100 |

FIGS. 2(a) and 2(b) set forth data in respect of flat membranes prepared in accordance with Example 1(c) and Table III sets forth data in respect of flat membranes produced in accordance with Example 1(d).

Table III

| | Data for Set 4 Flat Membranes | |
|---|---|---|
| Gelation Bath | Solute Separation, % | Water Flux gal/day/ft² |
| Methanol (50%)-Water | 3.3 | 468 |
| Ethanol (50%)-Water | 0.1 | 988 |
| Isopropanol (50%)-Water | 0 | 450 |
| Ethylene glycol (50%)-Water | 84.5 | 9 |

Tables I, II, III and FIGS. 2(a) and 2(b) give data on membrane flux in gallons/day/ft² of membrane surface, and solute separation for magnesium sulfate ($MgSO_4$) in dilute aqueous feed solutions at an operating pressure of 100 psig. Membranes capable of giving high solute separations for $MgSO_4$ can be used for several reverse osmosis applications; those giving low separations for $MgSO_4$ can be used for some reverse osmosis and some ultra-filtration applications; those giving no solute separation for $MgSO_4$ have relatively large average pore size on the membrane surface, and membrane flux increases with progressive increase in average pore size on membrane surface. The latter membranes can be used for a wide variety of ultra-filtration applications; this invention is particularly concerned with these latter membranes.

The composition and temperature of the casting solution were the same for all the membranes produced in Examples 1 and 2. The results given in Tables I, II, III and FIGS. 2(a) and 2(b) show that the membrane flux (and hence the average pore size on the membrane surface) can be changed from about 20 to over 10,000 gallons/day/ft² for membranes which can be used for ultra-filtration applications. Such wide variation in membrane flux was accomplished by control of solvent evaporation rate prior to gelation (i.e., by the appropriate choice of temperature of casting atmosphere, nature of the casting atmosphere and solvent evaporation period) and also by the control of the gelation conditions with which the present invention is particularly concerned.

Gelation control is concerned with the choice of the composition and temperature of the gelation medium, and gelation period prior to final leaching in water. The gelation medium commonly used in industry is cold water close to 0° C.

From FIGS. 2(a) and 2(b) it will be apparent that by appropriate combination of ethyl alcohol content in the gelation medium, and the temperature of the gelation medium, membrane fluxes ranging from 14 to over 10,000 gallons/day/ft² can be obtained at 100 psig operating pressure. The mole fraction of ethyl alcohol in the gelation medium in the range 0.1 to 1.0, and temperature of gelation medium in the range −20° C. to +30° C. are particularly suitable for making high flux ultra-filtration membranes.

The data given in Table III show that the use of methanol, isopropanol, or ethylene glycol instead of ethanol in the gelation medium gives similar results; the use of ethanol is superior to the other alcohols tested for making high flux ultra-filtration membranes.

EXAMPLE 3

Flat membranes were cast under the following conditions from a solution comprising (wt.%):
cellulose acetate (E-398-3): 25.0
acetone: 45.0
formamide: 30.0
Temperature of casting solution: 25° C.;
Temperature of casting atmosphere: 25° C.;
Humidity of casting atmosphere: 50%;
Solvent evaporation period: 5-120 secs. as specified;
Gelation medium: 0-95% ethanol-water mixture as specified;
Temperature of gelation medium: −10° to 25° C. as specified;
Gelation period: 1 hour.

This composition corresponds to that employed by Carter et al (supra). All membranes were hand cast as flat films on glass plates in a constant temperature-constant humidity room. All films were subjected to a pure water pressure of 300 psig for at least one hour prior to testing. All testing was carried out at 250 psig, 23°-26° C. using 3500 ppm sodium chloride-water as the feed solution at a constant feed flow rate of 400 cm³/min. FIG. 3 shows the effect of alcohol concentration in the gelation medium on the reverse osmosis performance of membranes resulting from the casting solution. Two sets of membrane performance data are given in FIG. 3. one set of data corresponds to gelation temperature of 0° C., and the other corresponds to gelation temperature of 22° C. The data on membrane performance corresponding to both the above gelation temperatures fall into three distinct regions. At the gelation temperature of 0° C., in region 1, product rate decreases from 185 to 50 g/hr and the corresponding solute separation increases from 8 to 23% with increase in alcohol concentration in the gelation medium up to ∼33%; in region 2, product rate increases from 50 to 220 g/hr and the corresponding solute separation decreases from 23 to 1% with increase in alcohol concentration from 33 to 57%; and in region 3, product rate decreases from 220 to 90 g/hr and the corresponding solute separation increases from 1 to 25% with increase in alcohol concentration from 57 to 95%. At the gelation temperature of 22° C., in region 1, product rate decreases from 90 to 25 g/hr and the corresponding solute separation increases from 10 to 65% with increase in alcohol concentration up to ~30%; in region 2, product rate increases from 25 to 730 g/hr and the corresponding solute separation decreases from 65 to 1% with increase in alcohol concentration from ~30 to 71%; and in region 3, product rate decreases from 730 to 310 g/hr and the corresponding solute separation increases from 1 to 4% with increase in alcohol concentration from 71 to 95%. Thus the data on membrane performance in the above three regions are similar in effect and quite different in magnitude at the two gelation temperatures.

Carter et al (supra) used this casting solution composition and alcohol concentrations up to 8.7 molar (which is less than 50% alcohol by volume) in the gelation medium at 20° C. Under the conditions of their experiments, product rate decreased and the corresponding solute separation increased with increase in alcohol concentration. These results are qualitatively similar to those obtained in region 1 for the present casting solution composition given in FIG. 3.

The decrease in product rate with corresponding increase in solute separation obtained with these membranes with the initial increase in alcohol concentration in the gelation medium (region 1) is also qualitatively similar to the changes observed by both Zisner and Loeb, 3rd Intern. Symp. on Fresh Water from Sea (Dubrovnik), 2, 615 (1970) and Frommer et al, Ind. Eng. Chem. Prod. Res. Develop., 10, 193 (1971). Since water is the predominant nonsolvent precipitating agent in region 1, following Frommer et al, the above changes may be attributed to the decrease in water activity with increase in alcohol concentration in the gelation medium, and the consequent decrease in the rate of water penetration in the membrane resulting in finer precipitation of polymer material constituting the membrane surface. Thus in region 1, an increase in alcohol concentration in the gelation medium results in a decrease in average pore size on the membrane surface.

As the alcohol concentration in the gelation medium increases further into the regions 2 and 3 in FIG. 3, the polymer precipitating power of alcohol and its interactions with the polymer (cellulose acetate), solvent (acetone), and nonsolvent-swelling agent (aqueous magnesium perchlorate or formamide) in the membrane matrix become progressively more important. These factors could affect both the precise instant of phase inversion and also the size, number and distribution of nonsolvent droplets (incipient voids) in the interdispersed phase during gelation, which ultimately determine the surface pore structure of the resulting membrane. The general increase in product rate with increase in alcohol concentration in the gelation medium in regions 2 and 3 in FIG. 3, and the existence of maxima and minima in product rate and solute separation data in the above regions indicate that the above factors include those having opposing tendencies in the direction of change of size, number and distribution of pores on the membrane surface and the effective thickness of the membrane.

EXAMPLE 4

Membranes Used for Ultra-Filtration

The tubular membranes prepared in Examples 1(a) and 2 (Table I) were tested under ultra-filtration conditions using various solutes, and operating temperatures and pressures, as set forth in Table VI below:

TABLE IV

| Membrane | Feed Details | Oper. ating pressure, psig | Operating temp. °C. | Solute separation, % | Membrane flux gal/day/ft$^2$ |
|---|---|---|---|---|---|
| T5 | Pure water permeation rate | 20 | 25 | — | 19.8 |
|  |  | 20 | 34 | — | 22.8 |
|  | Cutting oil emulsion #2; oil concentration ≈10% by weight; concentrate and product recycled. pH = 6.5 | 20 | 26 |  | 19.4 |
|  |  | 20 | 30 |  | 20.9 |
|  |  | 20 | 40 |  | 23.6 |
|  |  | 20 | 42 | 95 | 25.1 |
|  |  | 20 | 40 |  | 24.3 |
|  |  | 20 | 49 |  | 28.9 |
|  |  | 20 | 39 |  | 23.2 |
|  | Cutting oil emulsion #2 initial oil concentration in feed ≈12% weight; final oil concentration in the feed at the end of run ≈24%. pH = 6.5 | 20 | 33 | 99 | 20.5 |
|  |  | 20 | 34 | 99 | 21.3 |
|  |  | 20 | 33 | 99 | 20.5 |
|  |  | 20 | 33 | 99 | 20.5 |
|  |  | 20 | 30 | 99 | 21.3 |
|  |  | 20 | 29 | 99 | 17.1 |
|  | Pure water permeation rate after soap cleaning | 20 | 34 | — | 22.8 |
|  |  | 20 | 30 | — | 19.0 |
| T6 | 100 ppm Magnesium sulfate-water | 25 | 30 | 13.7 | 13.5 |
|  |  | 25 | 64 | 11.9 | 23.4 |
|  | Cutting oil emulsion #1 oil content: |  |  |  |  |
|  | 1.2% | 10 | 45 | 95 | 11.6 |
|  | 10.0% | 20 | 62 | 96 | 25.4 |
|  | 24.0% | 20 | 46 | 98 | 20.4 |
|  | 100 ppm Magnesium sulfate-water | 25 | 30 | 8.4 | 15.0 |
| T6 | Pure water permeation rate | 20 | 17 | — | 16.2 |
|  |  | 20 | 24 | — | 19.8 |
|  |  | 20 | 28 | — | 20.9 |
|  |  | 20 | 34 | — | 23.2 |
|  | Cutting oil emulsion #2, oil content ≈10% increased slightly during the run. pH = 6.5 | 20 | 33 | 90 | 18.3 |
|  |  | 20 | 48 | 90 | 25.5 |
|  |  | 20 | 65 | 90 | 23.6 (Product highly colored due to emulsifier) |
| T7 | Pure water permeation rate | 20 | 15 | — | 13.6 |
|  |  | 20 | 30 | — | 19.9 |
|  |  | 20 | 43 | — | 22.6 |
|  |  | 20 | 49 | — | 27.3 |
|  |  | 20 | 55 | — | 31.7 |
|  |  | 20 | 60 | — | 34.6 |
|  | Cutting oil emulsion #1 20 gallons concentrated to 9 gallons; feed was not of uniform consistency oil content: |  |  |  |  |
|  | 0.32% | 20 | 29 | 93 | 16.1 |
|  | 0.5% | 20 | 59 | 93 | 33.7 |
|  | 0.64% | 20 | 58 | 93 | 32.5 |
|  | 14.4% | 20 | 32 | 94.8 | 17.8 |
|  | 28.8% | 20 | 62 | 97.0 | 27.9 |
|  | 36.4% | 20 | 30 | 98.2 | 16.8 |
|  | 45% | 20 | 53 | 99.3 | 28.8 |
|  | 48% | 20 | 59 | 99.9 | 15.4 |
|  | 50% | 20 | 49 | 100 | 5.5 |
|  | 18 hour run; feed flow rate: |  |  |  |  |

TABLE IV-continued

| Membrane | Feed Details | Oper. ating pressure, psig | Operating temp. °C. | Solute separation, % | Membrane flux gal/day/ft² |
|---|---|---|---|---|---|
| T8 | 1100 gal/hr; membrane area: 1 ft² Pure water permeation rate | 11 15 20 | 38 40 40 | — — — | 79.4 118.0 158.0 |
|  | 3% potato starch suspension in water | 11 15 20 | 40 40 40 | 100 100 100 | 79.0 112.5 114.5 |
| T8 | Alberta clay suspension in water, 5% bentonite | 11 15 21 | 44 48 50 | 100 100 100 | 91.3 128.5 168.7 |
| T8D (drop method of casting) | Pure water permeation rate | 10 | 42 | — | 139 |
|  | Cutting oil emulsion #1, oil content 5%, pH = 6 | 10 22 | 60 56 | 90 75 | 28.5 47.5 (membrane fouled) |
| T8D (drop method of casting) | Pure water permeation rate | 11 15 20 | 40 40 40 | — — — | 30.8 45.6 62.7 |
|  | Potato starch suspension in water; starch content: 100 grams/5 gal. | 11 15 20 | 40 37 37 | 100 100 100 | 28.5 40.2 53.2 |
|  | 200 grams/5 gal. | 11 15 20 | 40 41 41 | 100 100 100 | 29.3 41.8 57.0 |
|  | 3% by weight | 20 | 40 | 100 | 54.0 |
| T10 | Pure water permeation rate | 20 20 20 20 | 20 25 28 30 | — — — — | 152 164 168 180 |
|  | Water slurry consisting of coal tailings made up of 50% coal and 50% ash: Solids content in feed: 0% | 20 | 30 | 100 | 180 |
| T10 | 10% 20% 30% 35% 40% 45% 50% | 20 20 20 20 20 20 20 | 30 30 30 30 30 30 30 | 100 100 100 100 100 100 100 | 168 162 153 149 140 114 62 |

(T10 membrane was similar to those described in Example 1(a) and was made under the following conditions:
Length of solvent evaporation zone: 12 inches;
Atmosphere above evaporation zone: ambient air + acetone;
Gelation bath: 95% Ethyl alcohol-water;
Temperature of gelation bath: 20° C.;
Gelation time: 10 minutes.)

We claim:

1. In a process for producing a cellulosic ester semipermeable membrane wherein a thin film is cast from a mixture comprising cellulosic ester polymer, pore-forming additive and casting solvent, a portion of the casting solvent may be removed from the film and the film is immersed in a gelation bath containing a polar organic compound which is miscible with said casting solvent, the improvement, for producing an ultra-filtration membrane, comprising controlling the temperature of said gelation bath at a selected temperature in the range −20° C. to +30° C. and selecting said polar organic compound to be an alcohol in a concentration, in said gelation bath greater than that required to produce an initial minimum flux for said membrane, equivalent to point B in FIG. 2a.

2. A process as claimed in claim 1 wherein said alcohol is selected from the group comprising lower monohydric alcohols, dihydric alcohols, trihydric alcohols and mixtures thereof.

3. A process as claimed in claim 2 wherein said gelation bath comprises an aqueous solution of said alcohol.

4. A process as claimed in claim 3 wherein said alcohol in said solution is present in an amount from 25–100% by volume.

5. A process as claimed in claim 4 wherein said gelation bath comprises 25–95% by volume ethyl alcohol in water.

6. A process as claimed in claim 4 wherein said thin film is cast at a temperature in the range 18°–26° C.

7. A process as claimed in claim 6 wherein said gelation bath is at a temperature in the range −20° to +30° C.

8. A process as claimed in claim 1 wherein said film is immersed in a separate leaching bath following said gelation bath.

9. A cellulosic ester ultra-filtration membrane produced by the process of claim 1 having a water flux rate in the range 14–10,000 gals/sq.ft./day at 100 psig, and a magnesium sulphate rejection at 100 psig below about 40%.

10. An ultra-filtration membrane as claimed in claim 9 wherein said film is cast from a mixture comprising:
13–19 weight % cellulose acetate
58–68 weight % acetone
14–22 weight % water
1.3–3.3 weight % magnesium perchlorate.

11. An ultra-filtration membrane as claimed in claim 10 having a molecular weight cut off in excess of about 15,000.

12. A process as claimed in claim 2 wherein said alcohol is selected from the group consisting of ethyl alcohol, methyl alcohol and mixtures thereof.

13. A process as claimed in claim 7 wherein said gelation bath is at a temperature in the range 0° C. to 20° C.

* * * * *